(12) United States Patent
Wormsbaecher

(10) Patent No.: US 6,257,798 B1
(45) Date of Patent: Jul. 10, 2001

(54) UNIVERSAL JOINT COUPLING

(75) Inventor: Hans Wormsbaecher, Lake Orion, MI (US)

(73) Assignee: GKN Automotive, Inc.

( * ) Notice: Subject to any disclaimer, the term of this patent is extended or adjusted under 35 U.S.C. 154(b) by 0 days.

(21) Appl. No.: 09/307,538

(22) Filed: May 7, 1999

(51) Int. Cl.$^7$ ..................................... F16B 3/04
(52) U.S. Cl. .................. 403/359.5; 403/357; 464/74
(58) Field of Search .................. 403/359.5, 359.4, 403/359.1, 357, 356, 355, 359.6, 359.2, 74, 57, 358; 464/158, 160, 120, 125, 180, 101, 74

(56) References Cited

U.S. PATENT DOCUMENTS

| | | | | |
|---|---|---|---|---|
| 1,645,342 | * | 10/1927 | Moorhouse | 403/357 X |
| 2,807,485 | * | 9/1957 | Seibert | 403/356 |
| 3,487,903 | * | 1/1970 | Stickan | 403/359.2 X |
| 3,722,929 | * | 3/1973 | Gilman | 403/359.6 |
| 4,437,782 | * | 3/1984 | Geisthoff | 403/359.5 X |
| 4,552,544 | * | 11/1985 | Beckman et al. | 464/162 |
| 4,792,713 | * | 12/1988 | Bush | 403/357 X |
| 5,674,026 | * | 10/1997 | Ishibashi et al. | 403/359.5 |
| 5,807,180 | * | 9/1998 | Knodle et al. | 464/139 |

* cited by examiner

Primary Examiner—Harry C. Kim
(74) Attorney, Agent, or Firm—Mick A. Nylander

(57) ABSTRACT

A slip joint assembly provides radial clearance compensation between a slip joint yoke and a receiving member. The slip joint yoke has a plurality of male splines formed externally thereon. The receiving member receives the splined yoke therein and has female splines which mate with the male splines of the yoke. The receiving member also has a plurality of circumferentially distributed, longitudinally extending, axis-parallel openings formed therein. The slip joint assembly further includes an elongated member having a C-shaped cross-section. The elongated member is compressibly received within each of the plurality of longitudinally extending openings and engages the splined shaft for providing a radial force between the splined shaft and the receiving member. This elongated member is preferably formed of a spring material to allow it to be compressible.

10 Claims, 3 Drawing Sheets

UNIVERSAL JOINT COUPLING

TECHNICAL FIELD

This invention relates to a universal joint coupling and more particularly to a universal joint assembly having an associated coupling with a radial clearance compensator.

BACKGROUND ART

The four-wheel drive feature on certain motor vehicles is a power transfer system that allows the vehicle to be driven by all four wheels, resulting in improved traction and control of the vehicle. Some types of four-wheel drive vehicles include a driveline which is equipped with a transfer case. The transfer case allows both the front and rear axles to be driven. Particularly, the function of the transfer case is to transfer engine torque from the transmission to the relevant propeller shafts which extend to both the front and rear axles.

Typically the four-wheel drive feature of such vehicles is operable via an auxiliary switch or a manual shifting by which the front-wheel drive can be engaged and disengaged at will. All-wheel drive (AWD) is a variation of four-wheel drive which shifts automatically during the appropriate driving situations, instead of requiring the operator to manually shift as in four-wheel drive. Because the propeller shafts which extend to each axle are continually moving with respect to each other, the transfer case is normally located in the mid-point area of the vehicle in order to provide service to both axles.

The driveline of a typical four-wheel drive vehicle also includes a slip joint between the propeller shafts and the transfer case which serves to accommodate the changes in distance between the axles and the transfer case as the front and rear wheels move up and down during operation of the vehicle. The slip joint is used to lengthen or shorten the propeller shaft and is typically a splined shaft coupling such as a universal joint of the cardan type. Proper alignment of this type of universal joint in conjunction with its attached coupling, such as the transfer case, is desirable. Such alignment is particularly desirable because improper or incorrect positioning of the splined shaft with the mating splines of the coupling may result in noise, vibration and harshness in the joint and in the overall assembly. Misalignment may also result in undesirable forces therebetween.

Consequently, a need has developed for an improved connection between a slip joint and its mating coupling, in order to reduce any noise, vibration and harshness in the assembly. There is a further need to improve the connection between the splined universal joint shaft to the adjoining coupling. The improved connection should also provide for a better and more efficient torque transmittal generally between mating splined components.

BRIEF SUMMARY OF THE INVENTION

It is an object according to the present invention to provide an improved connection between a mating externally splined shaft and an internally splined bore.

It is another object according to the present invention to provide an improved splined connection assembly which provides for a radial force from an internally splined shaft to an externally splined shaft in order to better compensate for radial clearance deviations therebetween.

It is still another object according to the present invention to provide a splined connection assembly which results in less noise, vibration and harshness during operation.

It is also an object according to the present invention to provide a splined connection assembly which has better shock absorption properties.

It is a further object according to the present invention to provide an improved connection for a motor vehicle between a transfer case having an internally splined shaft and an slip joint having an externally splined yoke, as well as providing for improved gearing tolerances.

It is also another object according to the present invention to provide for a radially adjustable force between the splined universal joint shaft and the coupling in which it is received.

In carrying out the above objects, features and advantages of the present invention, provided is a slip joint and connector assembly which has slip joint with an externally splined shaft which is received in and mates with an internally splined shaft of a connector housing. The slip joint and connector assembly includes a plurality of radially compressible, elongate members. Each elongate member is received within a corresponding longitudinally extending, axis-parallel opening disposed in the housing. Each elongate member engages the externally splined shaft and the internally splined shaft and provides for a radial force which compensates for clearance deviations therebetween. In a preferred embodiment the radially compressible, elongate member has a C-shaped cross-section which permits radial compression.

In another embodiment, the invention includes a transfer case of a motor vehicle having a housing and an internally splined shaft therein for mating with an externally splined shaft. The housing includes a plurality of circumferentially distributed, longitudinally extending, axis parallel recesses. Received within each recess is a radially compressible elongate member which engages the splined output shaft and provides a radial force between the universal joint and the transfer case. In a preferred embodiment, there are three axis parallel recesses which are radially distributed at 120° from each other. In a still preferred embodiment, the elongate member has a C-shaped cross-section and is received within a correspondingly shaped recess. In still another embodiment, the recess is disposed in the housing adjacent the internally splined shaft so that the internally splined shaft opening and each of the recesses forms a continuous cavity.

The above objects and other objects, features an advantages of the present invention are readily apparent from the following detailed description of the best modes for carrying out the invention when taken in connection with the accompanying drawing, wherein like reference numerals correspond to like components.

BEST MODE FOR CARRYING OUT THE INVENTION

Figure 1:
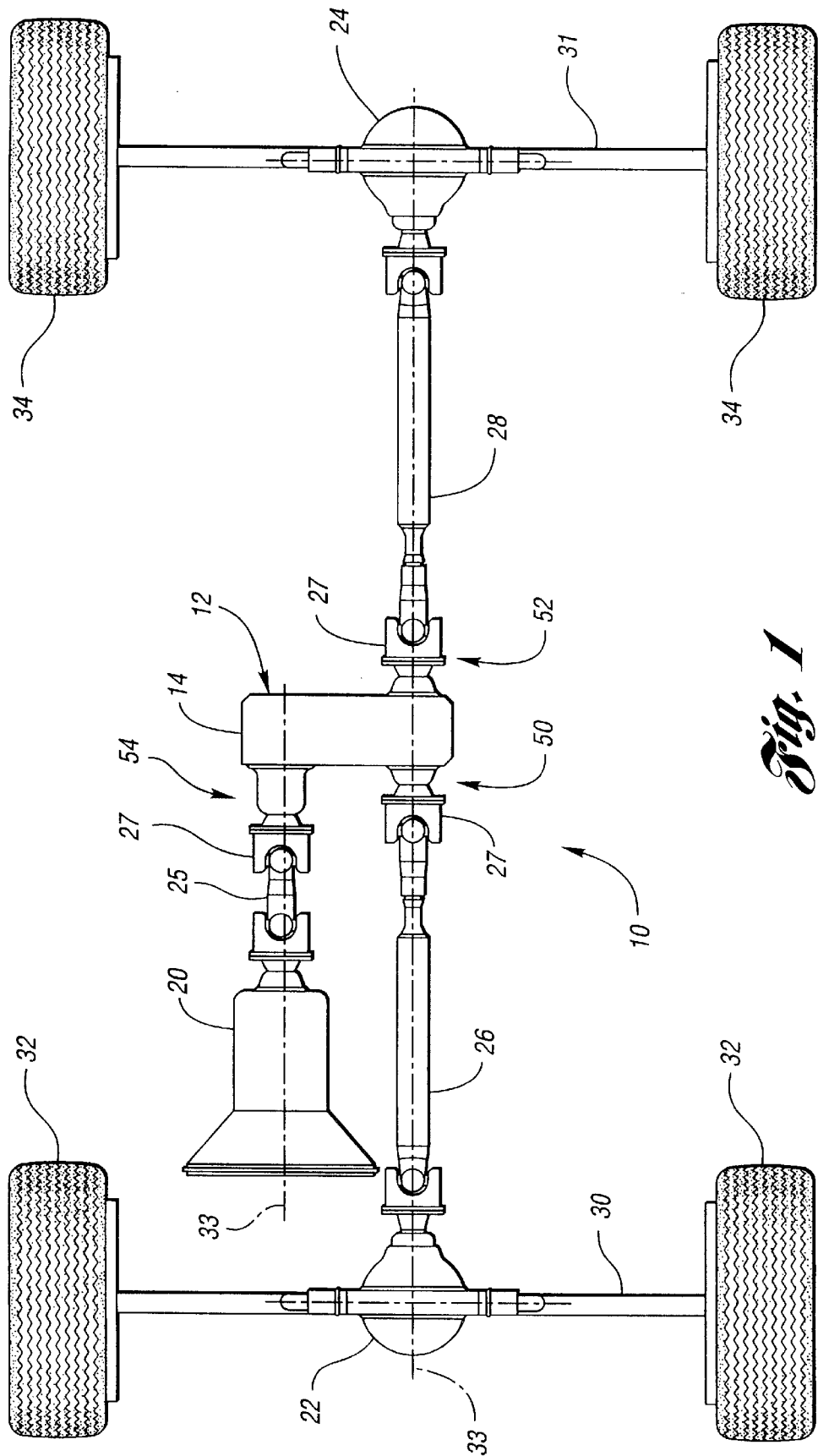
FIG. 1 is a top plan view of a power transfer system for a four-wheel drive motor vehicle using the splined shaft connection according to the present invention.

In accordance with the teachings of the present invention, FIG. 1 of the drawings shows a schematic top plan view of a power transfer system 10 of a four-wheel drive vehicle according to the present invention. The power transfer system 10 includes a transfer case 12 having a housing 14. As shown more fully in FIG. 2, housing 14 encloses a plurality of internally splined annular bores 16. Such internally or female splined bores 16 serve as an input or an output bore, as discussed further herein. Each internally splined bore 16 receives therein a splined shaft having external or male splines 47 thereon, such as the output shaft 18 of universal joint attached to the mainshaft 25 of a transmission gearbox 20 which is either manually or automatically controlled. The present invention contemplates that constant velocity universal joints may also be used in the present invention in place of universal or cardan joints shown in FIG. 1.

Figure 2:
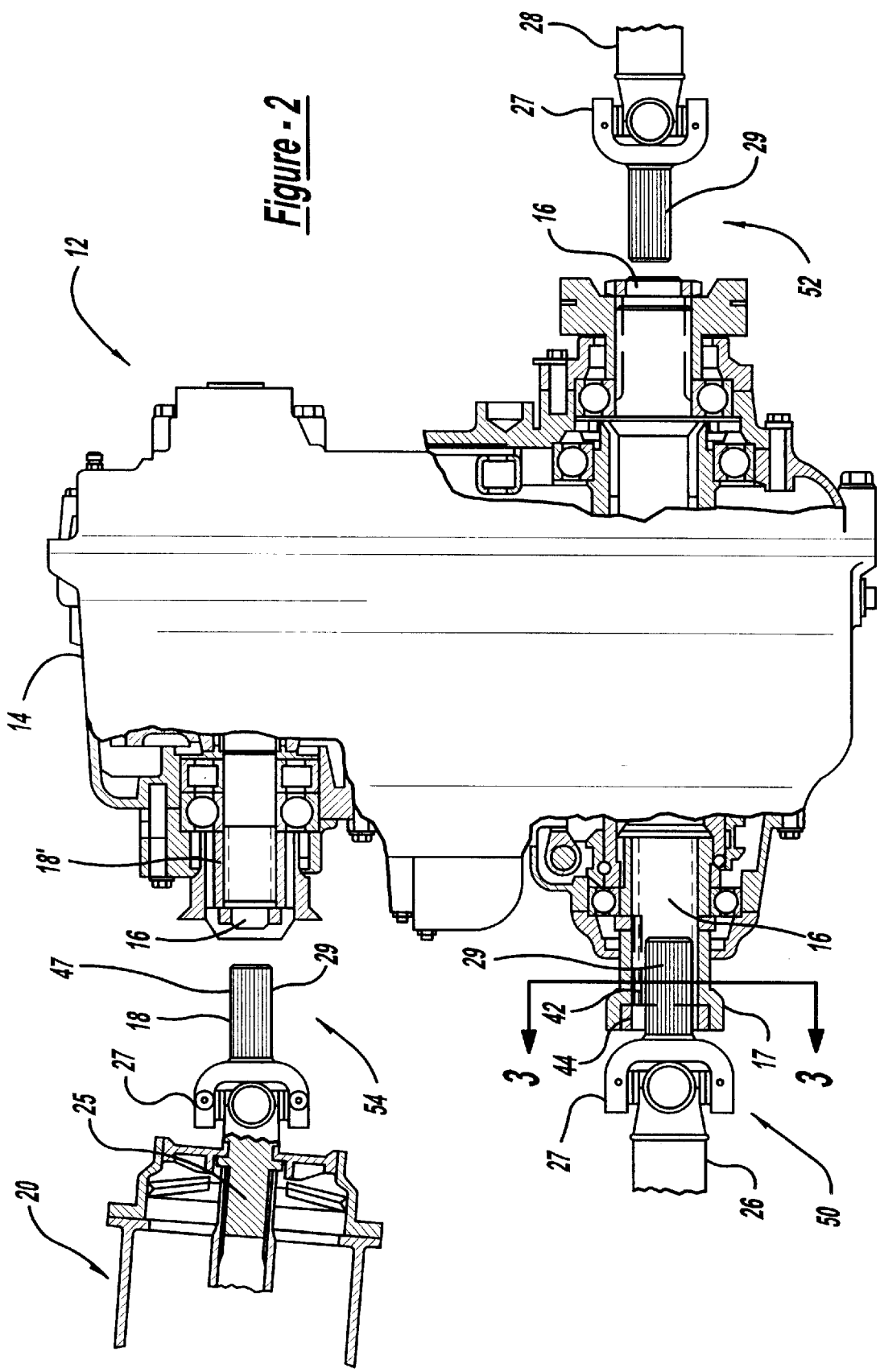
FIG. 2 is a partial sectional top plan view of the transfer case and various splined shaft connections according to the present invention.

In a typical four-wheel drive vehicle (referring to the schematic illustration of in FIG. 1), the drive from transfer case 12 is transmitted to the front and rear final drive or differential units, 22 and 24, respectively, through two propeller shafts 26 and 28. As illustrated in FIGS. 1 and 2, each connection between the transfer case and propeller shafts 26 and 28, includes a slip joint 27 (or sliding coupling), as is known in the art. More particularly, slip joint 27 is a splined shaft coupling, single cardan (or Hooke's) universal joint. Such a joint has splined yoke 29. Slip joint 27 accommodates changes in distance between the various shafts 26 and 28, which provides for flexibility in the length of each propeller shaft as the corresponding wheels move up an down.

This balanced arrangement of power transfer components serves to compensate for any changes in the line of drive. Rear propeller shaft 28 may be coupled to a live rear axle 31 in the conventional manner, as is known in the art or to an independent suspension. Front propeller shaft 26 runs alongside the engine (not shown)and main transmission gearbox 20 and again is typically coupled to a live front axle 30 or to a final drive (differential) unit 22 mounted on the vehicle structure which drives the independently sprung front wheels 32 via drive axle shafts, as is known in the art. Each propeller shaft is usually formed of solid tubular steel having a one-piece construction. The driving wheels are thus free to move up and down in relation to the frame. The slip joint yoke 29 slides to accommodate the changes in angularity resulting from this movement. During operation, in order to transmit torque between transmission gearbox 20 and transfer case 12, splines 18 on universal joint yoke 29 engage and intermesh with internal splines 18' formed in bore 16 so that one may transmit torque to the other during operation.

With continued reference to FIG. 2, shown therein is an enlarged view of transfer case 12 and its respective universal joint connections in a partially unassembled state. More particularly, the respective connection between transfer case 12 and front propeller shaft 26 is designated as reference numeral 50; between transfer case 12 and rear propeller shaft 28 is designated as reference numeral 52; and between transfer case 12 and mainshaft 25 of gearbox 20 is designated as reference numeral 54. As previously mentioned, each shaft (mainshaft 25 and propeller shafts 26 and 28) includes a slip universal joint mounted at the connection end thereof. As is well-known in the art, slip joint 27 is attached in a manner such that it is able to articulate in relation to its respective shaft 25, 26 and 28. As mentioned, propeller shafts 26 and 28 transmit power from gearbox 20 to the final drive 22 and 24 of the vehicle, which in turn transmits power to turn front and rear wheels 32 and 34.

Figure 3:
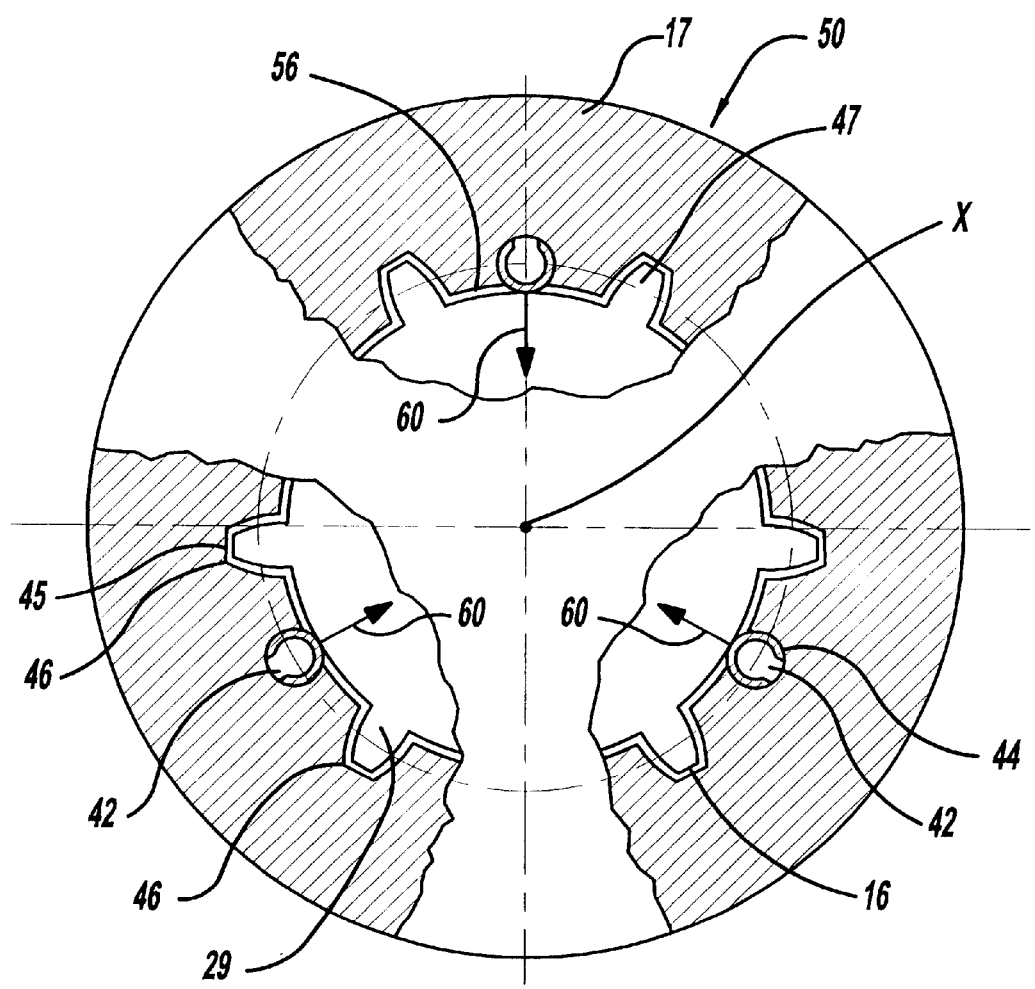
FIG. 3 is a sectional view taken along lines 3—3 of FIG. 2.

With reference now to FIG. 3 of the drawings, shown therein is a cross-sectional view taken along the line 3—3 of FIG. 2. Note that while the sectional line 3—3 in FIG. 2 is shown taken across joint connection 50, this is for illustrative purposes only, as sectional line 3—3 could also be taken representatively across joint 52 and 54. The cross-section illustrates an internally splined bore 16 which is defined by a bore shaft housing 17 in transfer case housing 14. Bore 16 receives a slip joint yoke 29 (shaft), such being representative of those in connections 50, 52 and 54, as shown in FIG. 2. In keeping with the present invention, provided are a plurality of circumferentially distributed, longitudinally extending, axis-parallel recesses 42 disposed within bore housing 17. Each recess 42 has a semi-circular cross-section which is shown as having a C-shape in FIG. 3.

More particularly, three axis-parallel recesses 42 are shown radially distributed in an equispaced manner about the axis of rotation "X" of the slip joint yoke 29 at 120° apart from each other. In a preferred embodiment, each recess 42 is disposed adjacent internally splined bore wall 45 of transfer case housing 14 so that bore 16 and each of the C-shaped recesses 42 form a continuous cavity.

Figure 4:
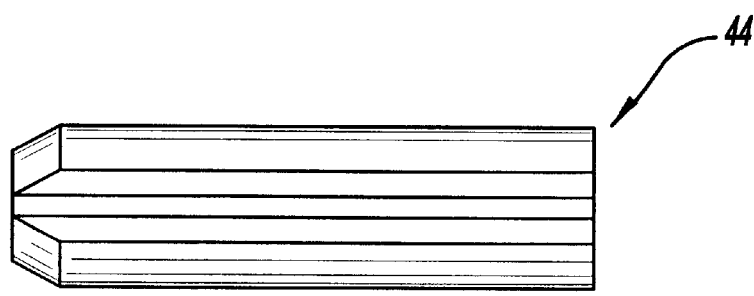
FIG. 4 is a side elevational view of the elongate member according to the present invention.

In keeping with the teachings of the present invention, a plurality of radially compressible, elongate members 44 are provided. Each elongate member 44 has a C-shaped cross-section and is received within a corresponding recess 42. An elevational view of such elongate member 44 is shown in FIG. 4. Each elongate member 44 is a split sleeve formed of a compressible spring steel material. Such material and shape allows for radial compression of elongate member 44 to allow for insertion into recess 42. Once inserted into recess 42 and assembled, each member expands to conform with its respective recess and provides an interference fit therein with housing recess 42 as well as with the corresponding yoke 29 which is inserted therein. As shown in FIGS. 2 and 3, in this assembled state each elongate member 44 engages splined yoke 29 for providing a radial force for compensating clearance deviations therebetween. This radial force is illustrated by the radially directed arrows 60 in FIG. 3. As shown in FIG. 3, each recess 42 may be oriented between an adjacent pair of the plurality of female splines 46 of shaft housing 17.

It is contemplated that the teachings according to the present invention may be applied to any splined shaft/bore assembly in which the goals and objects according to the present invention are desired. More particularly, bore 16 may either be an input bore such as that shown in connection 54 wherein torque is received from gearbox mainshaft 25; or bore may be an output bore such as in connections 50 and 52 whereby torque is transmitted to propeller shafts 26 and 28. Likewise each splined yoke/shaft may be an input or output shaft. In accordance with the previously discussed bores, for example, connection 54 includes an output shaft 18; while connections 50 and 52 include splined output yokes 29. Each universal joint is rotatable about an axis, such as axis 33.

Thus, elongate member 44 in its compressed state in recess 42 asserts a force onto yoke 29 in order to maintain the contact between the mating male and female splines, and also to keep shaft 29 centered within bore 16. Such centering is best illustrated in FIG. 3 by the slight displacement 56 between shaft 29 and bore housing 17 resulting from the force exerted by elongate member 44. This improved centering and alignment, therefore, serves to reduce any noise, vibration and harshness in the assembly. Thus, the connection between each slip joint 27 and coupling 16 is improved and a better and more efficient torque transmittal is generally maintained between the mating splined components.

While cardan slip joints are disclosed and shown herein for purposes of this invention, it is fully contemplated that the teachings according to the present invention may be applicable to any type of universal joint suitable for the application, including but not limited to a plunging tripod joint or a plunging ball and cage joint. Plunging or telescopic joints are typically used in propeller shafts, transfer case, and gearbox assemblies (such as that designated as reference numeral 10) in order to accommodate small variations in the effective length of the driveline. More particularly, power is transferred from the transmission to the transfer case to the propeller shafts to the final drive differential case, wherein the side shafts are splined to the side output gears at a right angle to the longitudinal axis of the propeller shaft in order to drive the corresponding wheels.

It is understood, of course, that while the forms of the invention herein shown and described include the best mode contemplated for carrying out the present invention, they are not intended to illustrate all possible forms thereof. It will also be understood that the words used are descriptive rather than limiting, and that various changes may be made without departing from the spirit or scope of the invention as claimed below.

What is claimed is:

1. A universal joint connection assembly comprising:
   a slip joint coupling having a splined shaft with a plurality of male splines formed thereon;
   a receiving member for receiving the splined shaft therein and having a plurality of female splines for mating with the plurality of male splines of the splined shaft, the receiving member further having a plurality of circumferentially distributed, longitudinally extending, axis-parallel openings; and
   an elongate member having a C-shaped cross-section received within an each of the plurality of longitudinally extending openings and engaging the splined shaft for providing a radial force between the splined shaft and the receiving member.

2. The slip joint connection assembly of claim 1 wherein the elongate member is formed of a spring steel material.

3. A receiver assembly for receiving a splined shaft having an externally splined yoke, the receiver assembly comprising:
   a receiving member having a housing and an internally splined cylindrical opening for receiving and mating with the externally splined yoke, the receiving member further having a plurality of circumferentially distributed, longitudinally extending, axis-parallel openings; and
   an elongate tubular member having a C-shaped cross-section received within each of the plurality of circumferentially distributed, longitudinally extending axis parallel openings and engaging the shaft for providing a radial force between the splined shaft and the receiving member.

4. The receiver assembly of claim 3 wherein each of the axis-parallel openings of the receiving member are radially distributed 120° apart from each other.

5. The receiver assembly of claim 3 wherein the elongate member is formed of a spring steel material.

6. A slip joint and receiver assembly comprising:
   a slip joint having a splined yoke with a plurality of male splines formed thereon;
   a receiving member having an inner surface defining an opening for receiving the splined yoke of the slip joint, the opening having a plurality of female splines for mating with the plurality of male splines of the splined yoke, the receiving member further having a plurality of circumferentially distributed, longitudinally extending, axis-parallel, C-shaped recesses, each recess oriented between an adjacent pair of the plurality of female splines; and
   an elongate member having a C-shaped cross-section received within an each of the plurality of circumferentially distributal, longitudinally extending axis-parallel C-shaped recesses and engaging the splined yoke for providing a radial force between the slip joint and the receiving member.

7. The slip joint and receiver assembly of claim 6 wherein each of the axis-parallel, C-shaped recesses of the receiving member are radially distributed 120° apart from each other.

8. The slip joint and receiver assembly of claim 6 wherein the elongate member is formed of a spring steel material.

9. A propeller shaft and transfer case assembly comprising:
   at least one propeller shaft having a first end;
   a shaft coupling mounted to the first end of the at least one propeller shaft and having a splined shaft attached thereto;
   a transfer case having an axially extending opening for receiving the splined shaft, the opening having an inner surface with a plurality of female splines formed thereon for operably engaging the splined shaft for transmitting torque to the at least one propeller shaft, the transfer case further having a housing with a plurality of radially equispaced, longitudinally extending, axis-parallel recesses formed therein; and
   a clearance compensating member having a semi-circular cross-section and received within an each of the plurality of radially equispaced, longitudinally extending, axis-parallel recesses and engaging the splined shaft for providing a radial force between the shaft coupling and the transfer case.

10. The propeller shaft and transfer case assembly of claim 9 wherein the semi-circular cross-section of the clearance compensating member is a C-shaped cross-section.

* * * * *